Oct. 8, 1957  F. S. RIGGS  2,808,870
RIM
Filed Jan. 21, 1955

INVENTOR.
FREDERICK S. RIGGS
BY
R. L. Miller
ATTORNEY

United States Patent Office 2,808,870
Patented Oct. 8, 1957

2,808,870

RIM

Frederick S. Riggs, Akron, Ohio, assignor to The Goodyear Tire & Rubber Company, Akron, Ohio, a corporation of Ohio Application January 21, 1955, Serial No. 483,267

2 Claims. (Cl. 152—410)

This invention relates to rims and, more particularly, to multiple-piece rims for use with tubeless tires.

Heretofore, a substantial portion of the rims used with tubeless tires have been of one-piece construction, principally of the drop-center type. The use of drop-center rims is limited to passenger and small commercial vehicle use. It is a natural result with the extensive use of tubeless tires on passenger vehicles that the use would be extended into all fields.

With the larger sizes of truck tires, multiple-piece rims are required in order to provide for relatively easy mounting and dismounting. No major problem of providing an airtight seal between the tire and the adjacent rim parts is presented but difficulties are encountered in sealing the joints between the various parts of multiple-piece rims.

Several different ways have been attempted with varying degrees of success. Truck rims are subjected to high loads and develop high heat under such conditions, as well as constant small relative movements between the various parts. These factors are difficult conditions under which a permanent seal can be effected. It is therefore an object of this invention to provide a more effective seal for a multiple-piece rim for use with tubeless tires.

A general object of this invention is to provide a relatively simple and economical airtight seal for multiple-piece rims.

A further object of this invention is to provide a structure that requires a minimum change over the present rim structure.

A still further object is to provide a rim structure that can be used with tubeless tires or a tire and tube.

Another object of this invention is to provide a seal that may be adapted to many of the present multiple-piece rim structures.

Other objects and advantages of this invention will become apparent hereinafter as the description thereof proceeds, the novel features, arrangements and combinations being clearly pointed out in this specification, as well as the claims thereunto appended.

Figure 1:
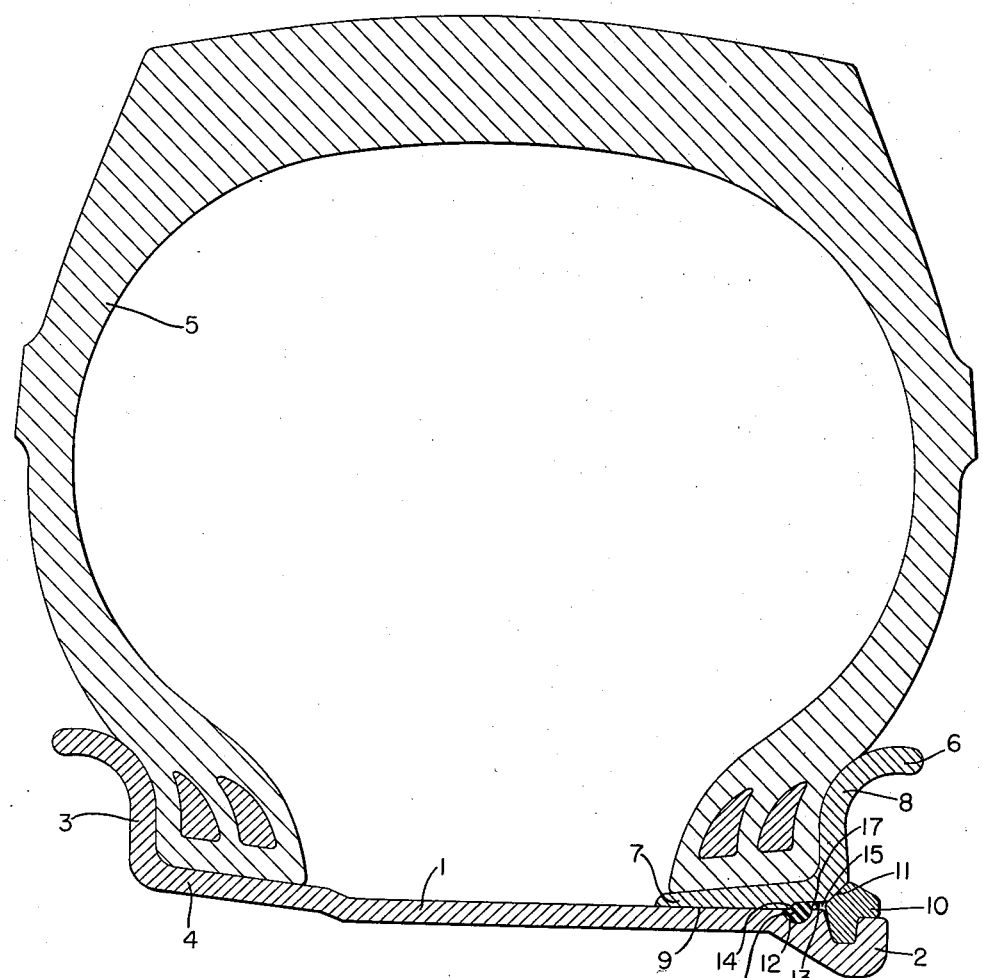
Figure 3:
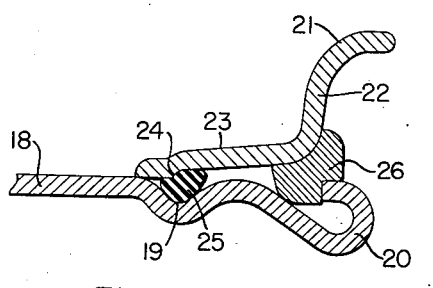
Figure 2:
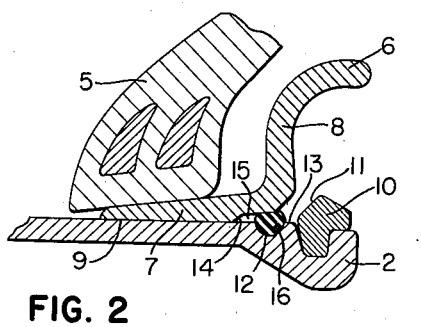

In the drawings Fig. 1 is a cross-sectional view of a rim incorporating the principles of this invention;

Fig. 2 is an enlarged section of a portion of the rim shown in Fig. 1 in the partially assembled position; and Fig. 3 is a section of a portion of a modification of the invention.

In Figs. 1 and 2 the numeral 1 represents the rim base having the gutter portion 2 along one edge thereof. This rim base may be formed of a rolled section of steel in the usual manner. Along the edge of the rim base 1 opposite the gutter 2 is a bead retaining flange 3 formed integral with the base 1. The portion of the rim base 1 immediately adjacent the flange 3 forms the bead seat 4 for one bead of a tire 5 when mounted on the rim in the usual manner.

In order to mount the tire 5 on the rim an endless flange ring 6 having a bead seat portion 7 extending inwardly from the flange portion 8 of the flange ring 6 is provided. The inner portion 9 of the inner periphery of the flange ring 6 is of a size to fit over the rim base 1. A split locking ring 10 of the cross-sectional contour shown having a portion complementary to the gutter 2 is adapted to be snapped into and out of the gutter to lock the flange ring 6 into position. The beveled shoulder 11 of the locking ring 10 engages a mating beveled portion on the flange ring 6 to firmly and positively lock and center the flange ring 6 in position with respect to the rim base 1.

In order to seal the joint between the bead seat portion 7 of the flange ring 6 and the rim base 1 an arcuate groove 12 is formed in the rim base adjacent the gutter 2. The outermost extremity of the groove 12 is spaced a short distance inwardly on the base from the edge of the gutter portion and provides a surface 13 of the rim base therebetween. The outer portion of the inner surface of the flange ring 6 is recessed to form outwardly facing shoulder 14 and space 15 between the rim base and the recessed portion of the flange ring 6. The shoulder 14 overlies the groove 12 in the rim base and the space 15 is over the surface 13 of the rim when the flange ring 6 is in the assembled position. A sealing element 16, preferably in the form of an annulus of an elastic deformable material such as rubber or plastic, is positioned in the groove 12 and is in firm contact with the shoulder 14 and recessed portion of the flange ring 6, as well as the groove 12 of the rim base 1.

The sealing element 16 is of a size to fit snugly in the groove 12 and is placed therein before the side flange ring 6 is finally positioned. The sealing element 16, when the rim is assembled, is deformed by the shoulder 14 to cause portion 17 of the sealing element 16 to occupy a portion of the space 15 between the recessed portion of the flange and surface 13 of the rim base. The portion 17 does not contact the locking ring 10, thus eliminating any possibility of the split in the ring 10 abrading the sealing element 16. The sealing element 16 is also subjected to general radial compression by the parts of the assembled rim.

In the form of the rim shown in Fig. 3 the rim base 18 is formed by rolling, according to the usual well-known techniques, sheet steel to the contour shown in Fig. 3, which includes an arcuate groove 19 and a rolled gutter portion 20 formed thereon. The endless side flange ring 21 having the retaining flange 22 and bead seat portion 23 preferably is formed also of a rolled section of sheet steel, although hot-rolled strips may be used. The flange ring 21 includes a shoulder 24 on the inner surface that overlies the groove 19 in the base portion 18 to engage the sealing element 25. The split locking ring 26 is of a contour to engage the mating portion of the flange ring 21 and the gutter 20 of the rim base. The sealing element 25 is similar to that described in connection with Figs. 1 and 2 and is deformed similarly in the assembled position.

It is believed that the manner of assembling the structure is obvious from the foregoing description. However, briefly to assemble either of the rims the tire 5, with the lock ring 10 or 26 and the flange ring 6 or 22 removed, is easily placed on the rim base 1. The flange ring 6 or 22 is then moved laterally onto the base with the beads of the tire yielding inwardly toward each other until the groove 12 or 19 is exposed. The sealing element 16 or 25 is then placed in position in the groove 12 or 19. The split locking ring 10 or 26 is then moved over and snapped into position in the gutter 2 or 20. Inflation of the tire through the valve, not shown, in the rim base then causes the tire beads to move outwardly onto their respective seats and in so doing the flange ring also moves laterally outwardly over the base until it engages the mating surface of the split locking ring 10 or 26. The shoulder portion of the inner periphery of the flange ring during this movement engages the sealing element to axially distort a portion of the sealing element over the surface of the rim base and at the same time radially compress the sealing element to provide a positive and permanent seal. With this seal the air pressure within the tire does not escape through the joint between the flange ring and the rim base.

If the tire should need to be removed for repair or replacement it is only necessary to reverse the procedure by moving the flange ring laterally inwardly over the base, removing the sealing element, split locking ring and flange ring, then sliding the tire from the rim. It is desirable that the sealing element be replaced each time the rim is reassembled.

From the foregoing it will be recognized that the rim structures described achieve the objects of the invention by providing an improved, inexpensive, simple and effective seal. The shoulder and recessed portions of the endless flange ring provide a positive seal by engaging the sealing element to axially and radially distort it automatically during the rim assembly. While the description has described the invention as applied to a rim with an integral side flange adjacent one side of the rim base, it is readily apparent that the invention could be adapted to both sides of a rim.

While certain representative embodiments and details have been shown for the purpose of illustrating the invention, it will be apparent to those skilled in the art that various changes and modifications may be made without departing from the spirit or scope of the invention.

Having thus fully described my invention, what I claim and desire to secure by Letters Patent of the United States is:

1. A multiple piece rim assembly adapted for use with tubeless tires comprising an endless generally cylindrical base portion having an integral gutter formed along one edge thereof and a radially outwardly facing groove in the base adjacent to and axially inwardly spaced from the gutter; an endless flange ring having a tire bead retaining flange and a bead seat portion extending axially inwardly from the flange, the axially inner portion of the radially inner face of the flange ring positioned over the base portion of the rim and the axial outer portion of the radially inner face of the flange ring being recessed radially outwardly to provide a space between the base portion of the rim and the radially inner face of the flange ring to form an axially outwardly facing shoulder on the inner face of the flange ring, said shoulder overlying said groove in the base portion and cooperating to form a chamber therebetween with an axially outwardly facing opening; a split locking ring engaging the gutter and flange ring to maintain the flange ring in position with respect to the base; and a resilient deformable sealing element in said chamber under radial and axial distortion to prevent escape of air between the flange ring and rim base, said distorted sealing element being spaced from the gutter and split locking ring and out of contact with the latter.

2. A multiple piece tubeless rim having a tire rim base, at least one demountable flange ring including a bead seat portion and a bead-retaining flange, a split lock ring, and sealing means to prevent the escape of air through the joint between the demountable flange ring and rim base, said sealing means comprising a groove in the outer face of the rim base positioned beneath the bead seat of the flange ring in the assembled position, an axially outwardly facing shoulder on the radially inner periphery of the flange ring which overlies said groove in the rim base, said shoulder and groove forming a chamber therebetween open axially outwardly and remote from the split locking ring, and a resilient deformable sealing element in said chamber, the shoulder of said flange ring engaging the sealing element as the flange ring moves axially into position to axially deform and radially compress said sealing element to prevent the escape of air through the joint, the distorted sealing element being spaced from the lock ring and out of contact with the latter.

References Cited in the file of this patent

UNITED STATES PATENTS

| 2,685,907 | Waddell | Aug. 10, 1954 |

FOREIGN PATENTS

| 305,533 | Great Britain | Jan. 18, 1929 |
| 686,145 | Great Britain | Jan. 21, 1953 |
| 523,758 | Belgium | Nov. 14, 1953 |
| 728,711 | Germany | Dec. 2, 1942 |
| 741,853 | France | Dec. 20, 1932 |